US008046165B2

(12) United States Patent
Sacle et al.

(10) Patent No.: US 8,046,165 B2
(45) Date of Patent: Oct. 25, 2011

(54) DEVICE FOR ASSISTING IN THE NAVIGATION OF AN AIRCRAFT IN AN AIRPORT ZONE

(75) Inventors: Jérôme Sacle, Toulouse (FR); François Coulmeau, Seilh (FR)

(73) Assignee: Thales (FR)

( * ) Notice: Subject to any disclaimer, the term of this patent is extended or adjusted under 35 U.S.C. 154(b) by 995 days.

(21) Appl. No.: 11/934,751

(22) Filed: Nov. 3, 2007

(65) Prior Publication Data

US 2008/0109160 A1 May 8, 2008

(30) Foreign Application Priority Data

Nov. 7, 2006 (FR) ...................................... 06 09709

(51) Int. Cl.
*G01C 21/30* (2006.01)

(52) U.S. Cl. ................ 701/208; 701/3; 701/14; 701/16; 701/35; 701/120; 701/200; 701/207; 701/211; 701/213; 340/300; 340/990; 340/945; 340/961; 340/968; 342/29; 342/33; 342/36; 342/357.31; 342/354; 375/219; 715/854

(58) Field of Classification Search ................ 701/3, 14, 701/16, 35, 120, 200, 207, 208, 211, 213, 701/300, 301; 340/825.72, 990, 945, 961, 340/968, 971, 973, 988; 342/29, 33, 36, 342/357.31, 354, 456; 375/66.1, 67.11, 67.13, 375/67.16, 219, 431; 715/854
See application file for complete search history.

(56) References Cited

U.S. PATENT DOCUMENTS 4,925,303 A * 5/1990 Pusic ........................ 356/139.03
4,975,696 A * 12/1990 Salter et al. .................... 340/973
5,519,392 A * 5/1996 Oder et al. ............... 340/995.27
5,548,515 A * 8/1996 Pilley et al. .................... 701/120
5,702,070 A * 12/1997 Waid ............................. 244/183
7,633,430 B1 * 12/2009 Wichgers et al. ............... 342/65
(Continued)

FOREIGN PATENT DOCUMENTS

EP 1347412 9/2003

OTHER PUBLICATIONS

Theunissen et al., "Integration of information in synthetic vision displays why to what extent and how?", Digital Avionics Systems Conference, IEEE, vol. 2 of 2, Conf. 9, pp. 9C31-9C39 (2003) XP010668923.

(Continued)

*Primary Examiner* — James Trammell
*Assistant Examiner* — McDieunel Marc
(74) *Attorney, Agent, or Firm* — Lowes Hauptman Ham & Berner, LLP

(57) ABSTRACT

The invention relates to a device for assisting in the navigation of an aircraft in an airport zone comprising a surface navigation system and means of acquiring in real time, while navigating on the ground or in flight, new information or temporary information relating to the navigation in the airport zone. The surface navigation system uses information relating to the navigation in the airport zone. The information is previously stored in a database on board the aircraft. The device includes means for decoding and analysing the new or temporary information relating to the navigation in the airport zone, means of filtering the information according to the airport concerned and the validity date of the information, means of correlating the information with the information previously stored, and means of displaying the information.

4 Claims, 2 Drawing Sheets

U.S. PATENT DOCUMENTS

| | | | | |
|---|---|---|---|---|
| 7,667,649 | B2 * | 2/2010 | LeFever et al. | 342/465 |
| 2002/0030607 | A1 * | 3/2002 | Conner et al. | 340/945 |
| 2002/0030610 | A1 * | 3/2002 | Ishihara et al. | 340/970 |
| 2004/0246178 | A1 * | 12/2004 | Smith | 342/454 |

OTHER PUBLICATIONS

Goehler, D.J., ED, Institute of Electrical and Electronics Engineers: "Jeppesen worldwide electronic NOTAM service", Proceedings of the Position Location and Navigation Symposium, IEEE, pp. 353-356 (1992) XP010056455.

Kamineni et al., "Electronic moving map of airport surface on electronic flight bag", Digital Avionics Systems Conference, IEEE, vol. 1, pp. 4C3-41 (2004) XP010764988.

Schiefele et al., "World-wide precision airport mapping databases for aviation applications", Digital Avionics Systems Conference IEEE, vol. 2 of 2, Conf. 9, pp. 13D31-13D39 (2003) XP010669026.

* cited by examiner

DEVICE FOR ASSISTING IN THE NAVIGATION OF AN AIRCRAFT IN AN AIRPORT ZONE

RELATED APPLICATIONS

The present application is based on, and claims priority from, France Application Number 06 09709, filed Nov. 7, 2006, the disclosure of which is hereby incorporated by reference herein in its entirety.

TECHNICAL FIELD

The present invention relates to assistance for the navigation of an aircraft in an airport zone. It more particularly concerns the acquisition, analysis and use of new or temporary information relating to said airport zone in the surface navigation and relief and obstacle detection systems. The term "airport zone" should be understood to mean the area covering an airport and its surroundings.

BACKGROUND OF THE INVENTION

NOTAMs (notices to airmen) are continuous publications of aeronautical information, warning of particular conditions that can affect air operation, including in particular the taxiing phase at the airports. The NOTAMs deal with a large quantity of new or temporary information that can impact on the surface navigation at an airport. A non-exhaustive list could include: temporary closure of taxiways and runways, failure of runway and taxiway light beaconage, modification of ground signaling, presence of obstacles in the vicinity of a taxiway, taxiway restrictions for certain types of airplanes, bird-related risk, presence of animals, presence of helicopters, presence of works.

NOTAMs are structured according to a standard defined by the international civil aviation organization (ICAO). The following NOTAM is given as an example.

A) LFBO TOULOUSE BLAGNAC

B) 200511281350 C) 200601282359

E) TWY T70 CLOSED

The field A relates to the airport concerned. LFBO denotes the ICAO code of the airport. In the example, this is Toulouse Blagnac. The fields B and C refer to the start and end of validity dates and times. The field E contains the description. In this example, the Taxiway T70 is closed.

Currently, the NOTAMs are printed then consulted manually by the pilots when preparing for the flight. This solution is not entirely satisfactory because consulting the NOTAMs increases the workload of the pilots in flight preparation. Also, once on board the aircraft, the pilots have only printed NOTAMs and are not in a position to take note of the latest NOTAMs that are published. Furthermore, the aircraft's navigation aid systems, based on previously stored information, do not exploit this last-minute information and therefore do not faithfully reflect the reality at a given instant. Among these systems, there are the surface navigation system (called On Board Airport Navigation System—OANS) or the relief and obstacle detection system (Terrain Awareness and Warning System—TAWS).

SUMMARY OF THE INVENTION

The invention aims to overcome the abovementioned problems by proposing a device making it possible to acquire and analyse the information contained in the NOTAM and use it in an aircraft's navigation aid systems. By implementing the invention, the map representing the airport can be made to show symbols corresponding to the information described in the NOTAMs. By implementing the invention, it is also possible to detect and anticipate collisions with objects described in the NOTAMs and not included in the obstacle databases.

To this end, the subject of the invention is a device for assisting in the navigation of an aircraft in an airport zone comprising a surface navigation system and means of acquiring in real time, while navigating on the ground or in flight, new information or temporary information relating to the navigation in said airport zone, said surface navigation system using information relating to the navigation in said airport zone, said information being previously stored in a database on board said aircraft, which comprises:

- means for decoding and analysing the new or temporary information relating to the navigation in the airport zone,
- means of filtering said information according to the airport concerned and the validity date of said information,
- means of correlating said information with the information previously stored,
- means of displaying said information.

Advantageously, the device for assisting in the navigation of an aircraft in an airport zone according to the invention also comprises means for generating symbols corresponding to said information and means for displaying said symbols.

Advantageously, the device for assisting in the navigation of an aircraft in an airport zone according to the invention also comprises a relief and obstacle detection system.

Advantageously, the new or temporary information relating to the airport zone comprises the following data:

- an airport identifier,
- a description of an event occurring on the airport zone corresponding to said airport,
- a validity start date of said event,
- a validity end date of said event.

Advantageously, the surface navigation system also comprises means for the textual display of the new or temporary information relating to an airport zone.

Advantageously, the relief and obstacle detection system uses an obstacle database and comprises:

- filtering means for selecting the new or temporary information relating to the navigation in the airport zone concerning particular obstacles,
- means for creating obstacles associated with said information,
- means for adding said obstacles to the obstacle database,
- means of displaying said obstacles,
- means for generating an alarm if the aircraft approaches too close to one of the obstacles defined in the obstacle database.

Advantageously, when the obstacles include an uncertainty as to their position, the relief and obstacle detection system also comprises means for generating a zone of uncertainty and for displaying said zone of uncertainty.

Advantageously, the relief and obstacle detection system also comprises means for the textual display of the new or temporary information relating to an airport zone concerning particular obstacles.

Advantageously, the new or temporary information relating to an airport zone comprises NOTAMs.

Advantageously, the device for assisting in the navigation of an aircraft in an airport zone according to the invention comprises means of acquiring new or temporary information relating to an airport zone.

BRIEF DESCRIPTION OF THE DRAWINGS

The invention will be better understood, and other advantages will become apparent, from reading the detailed description and with the help of the figures, in which.

DETAILED DESCRIPTION OF THE INVENTION

Figure 1:
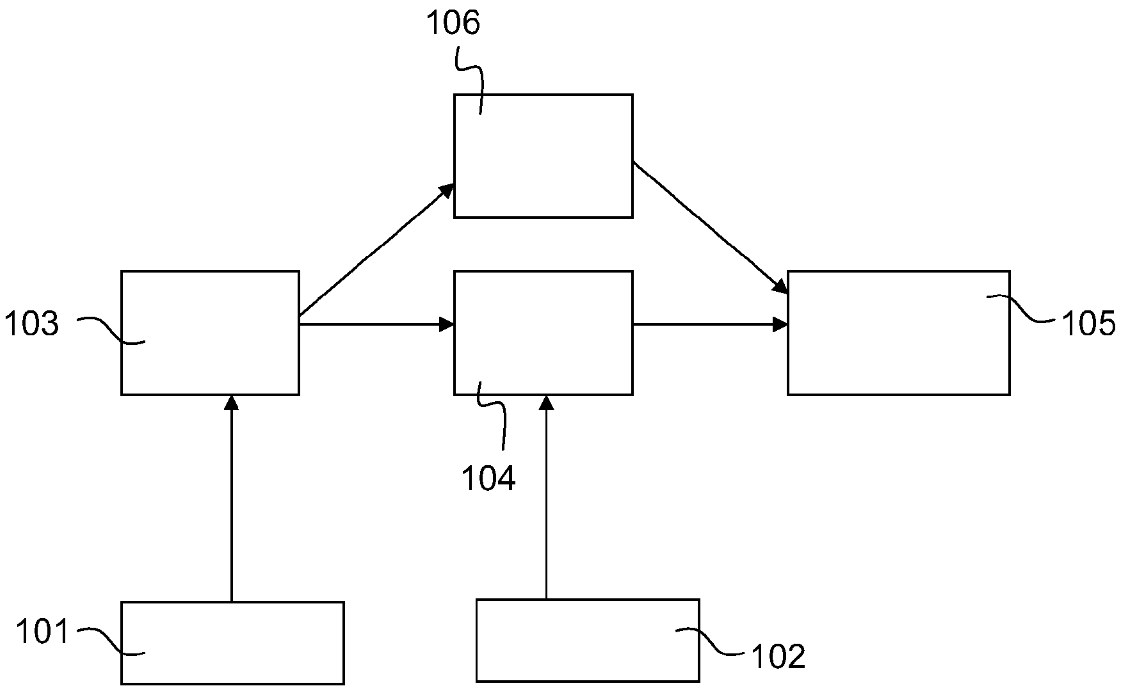
FIG. 1 represents an architecture of an exemplary embodiment of the inventive device.

FIG. 1 represents an architecture of one exemplary embodiment of the inventive device. The inventive device is hosted in the surface navigation system 104 which can be of OANS type and the relief and obstacle detection system 106. Said surface navigation system 104 is in contact with a ground station 101 via a communication module 103 called CMU (Communication Management Unit). The CMU 103 receives coded NOTAMs sent by the ground station 101 and transmits them to the navigation system 104 and to the relief and obstacle detection 106. The navigation system 104 receives and decodes the NOTAMs and generates the corresponding objects to include them in a surface navigation map. This map is displayed on a display means 105. The surface navigation system 104 is also linked to the FMS 102 which sends it a flight plan and predictions. The relief and obstacle detection system 106 receives and decodes the NOTAMs and generates the corresponding obstacles to include them in the obstacle database.

Advantageously, the inventive device comprises means of acquiring in real time, while navigating, new or temporary information relating to the navigation in an airport zone. The NOTAMS can be transmitted in digital format by a coded data link between the airplane and the ground, such as ACARS (ARINC Communication Addressing and Reporting System) or CPDLC (Controller Pilot Data Link Communications). The airport information service DATIS (Datalink Aerodrome Terminal Information Service) can be the source of this data. However, this concerns only a small number of NOTAMs applicable to the surface navigation map. The other NOTAMs can be acquired by data links with operations of the airline, already formatted, or with a dedicated server making them available, such as the Olivia database of the French DGAC (Civil Aviation General Directorate).

Advantageously, the inventive device comprises means of decoding and analysing the information acquired. A text analysis is applied to the field E of the NOTAM in order to recognize certain key words and interpret the event described in the NOTAM.

Advantageously, the inventive device comprises filtering means. Once the analysis has been made, a number of filters are applied to eliminate the non-relevant information. A first filter selects the NOTAMs applicable to surface navigation. In the list of NOTAMs assigned to an airport, some are applicable to surface navigation, others to departure and arrival flight procedures. The display on the map of the decoded NOTAMs does not therefore constitute an exhaustive list of the airport's NOTAMs. The pilots must continue to consult the list of published NOTAMs.

A second filter concerns the airports. The filter determines whether the airport indicated in the field A of the NOTAM is the departure airport or arrival airport communicated by the FMS 102. Only the information concerning the current flight is displayed.

A third filter relates to the validity date. The validity time band of the NOTAM is correlated to the departure and arrival dates of the aircraft at the airport concerned. These dates are derived from the predictions supplied by the FMS 102. Only the NOTAMS with a time period that corresponds to the presence of the airplane will be displayed.

Advantageously, the inventive device includes means of correlating the information acquired with the information stored previously. The system can carry out checks on the field E, in particular: checking that the runways, the parking areas and the taxiways obtained from the NOTAM do indeed exist in the airport's database.

Advantageously, the inventive device includes means for generating symbols. The inventive device makes it possible to associate a symbol with the events described in the field E of a NOTAM. The following examples illustrate the possible applications.

A) LFBO TOULOUSE BLAGNAC
B) 200511281350 C) 200601282359
E) TWY T70 CLOSED

This first exemplary NOTAM means that the Taxiway T70 at the Toulouse Blagnac is closed. The closure of the taxiway can be represented by an appropriate color or an appropriate symbol overlaid on the taxiway.

A) LFPG PARIS CHARLES DE GAULLE
B) 200507150000 C) 200512312359
E) WORKS TAXIWAY 'E1' AND PARKING AREAS CF': REFER
TO THE SUP AIP 88/05.

This second exemplary NOTAM means that works are in progress on taxiway E1 and on the parking area F. Given that the exact location of the works on the parking area F is not detailed in the text, the parking area can be marked with the works symbol to draw the attention of the pilot.

A) EGLL LONDON/HEATHROW
B) 200510070600 C) 200512092359
E) TWY A CLOSED BTN E AND H DUE WIP)

This third exemplary NOTAM means that the taxiway A is closed between taxiways E and H because of works. The taxiway is marked closed by a color or the "works" symbol is displayed.

For complex NOTAMs (for example, an action that is the subject of a sentence), a search is carried out in the character string E for the geographic location to which the NOTAM applies, and a mini-window is displayed, that can be enlarged to read the message. For example, for the following NOTAM:

A) EDDF FRANKFURT MAIN
B) 200506280639 C) 200512312359 EST
E) WINDSHIFT AND TURBULENCE ON RWY 18: WITH WINDS BETWEEN DIRECTION 200 DEG AND 160 DEG CLOCKWISE AND SPEEDS OF 15 KT AND MORE ON RWY 18 GUSTS AND STRONG WINDSHIFTS UP TO TAIL WIND COMPONENTS MAY OCCUR.)

RWY18 is extracted from the message and the message is positioned at the threshold of the runway 18.

The NOTAMS that have no detail or refer to complementary documents (AIP SUP) can be preformatted by the operations of the company responsible for administering the NOTAMs. They will be sent by a data link with the other NOTAMs in order to be incorporated more easily in the map by the surface navigation system.

Figure 2:
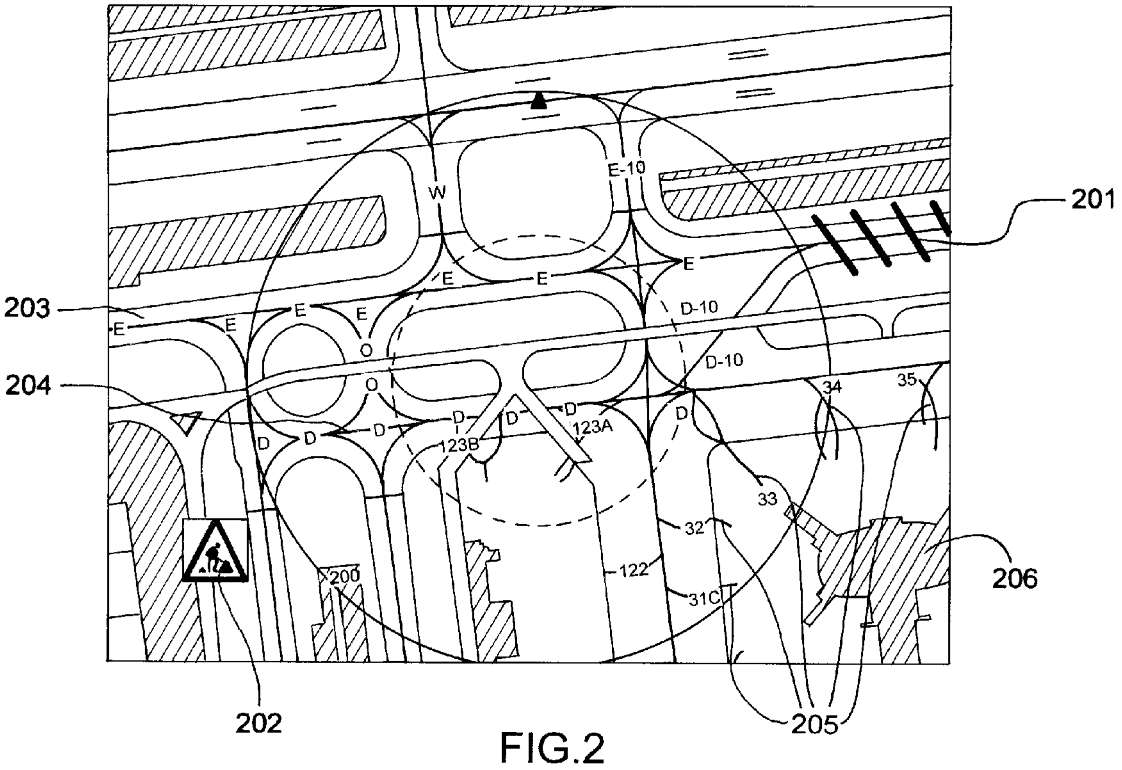
FIG. 2 represents a display of the map of an airport including symbols created by the inventive device.

Advantageously, the inventive device includes means of displaying symbols. FIG. 2 represents an example of display of the map of an airport including symbols created by the inventive device. A hangar 206 is located bottom right in the map. This hangar 206 is surrounded with airplane parking areas 205. A first taxiway 204 is located above the airplane parking areas 205. A second taxiway 203 is located above and parallel to the first taxiway 204. A symbol 202, generated by the inventive device, indicates works in this part of the airport.

A symbol (cross-hatching) 201, generated by the inventive device, indicates that the cross-hatched part of the taxiway 203 is closed.

The display of the NOTAMS is considered to have the same level of reliability as the display of the other information from the surface navigation database. The information is assumed to be integrated as input for the CMU which transmits it to the OANS.

Advantageously, the inventive device signals the rejected NOTAMS, applicable to surface navigation. The rejected NOTAMS are those for which the description of the field E is incomplete or not explicit enough.

Advantageously, the device for assisting in the navigation of an aircraft in an airport zone according to the invention also comprises means for the textual display of new or temporary information relating to an airport zone. All of the NOTAMS received for an airport are displayed on an appropriate page relating to the airport, so making it possible to correlate the information in case of doubt as to the display of a symbol on the surface map.

Advantageously, the relief and obstacle detection system comprises means of acquiring and analysing the new or temporary information relating to an airport zone. The NOTAMs are also taken into account in the relief and obstacle detection system. The relief and obstacle detection system also comprises means for filtering the NOTAMs. The NOTAMs taken into account are those concerning the artificial obstacles such as cranes and new constructions close to the airports.

The applicable NOTAMS are included as objects associated with a position in an obstacle database. These objects can be committed to a permanent database if their temporary nature disappears.

The created objects are displayed on a dedicated device.

The following NOTAM is given as an example.

A) EGLL LONDON/HEATHROW

B) 200610070600 C) 200612092359

E) 2 CRANES height 150 ft AGL PSN Radial 180 deg/1500 m threshold RW 27L

This NOTAM indicates that, at London Heathrow airport, two cranes are located at the threshold of the runway 27L. The inventive device computes the position of the latter to include them on the map. More generally, a position can be expressed in a NOTAM in the form of coordinates or by reference to a known point (for example, the runway threshold).

Advantageously, in case of uncertainty as to the position of the obstacle from the NOTAM, the inventive device creates and displays a circle of uncertainty.

The invention claimed is:

1. A device for assisting in navigation of an aircraft in an airport zone comprising a surface navigation system embedded in the aircraft and means of acquiring in real time, while navigating on the ground or in flight, new information or temporary information relating to the navigation in said airport zone, said surface navigation system adapted to use information relating to the navigation in said airport zone, said information previously stored in a database on board of said aircraft, said surface navigation system also comprising an obstacle database and a relief and obstacle detection system, comprising:

filtering means for selecting the new or temporary information relating to the navigation in the airport zone concerning ground obstacles, means for creating obstacles associated with said information, and for determining positions of said obstacles, means for adding said obstacles to the obstacle database, in order to be taken into account by the relief and obstacle detection system, means of displaying said obstacles, and means for generating an alarm if the aircraft approaches too close to one of the obstacles defined in the obstacle database.

2. The device for assisting in the navigation of an aircraft in an airport zone as claimed in claim 1, wherein, when the obstacles include an uncertainty as to the position of each corresponding obstacle, the relief and obstacle detection system also comprises means for generating a zone of uncertainty and for displaying said zone of uncertainty.

3. The device for assisting in the navigation of an aircraft in an airport zone as claimed in claim 1, wherein the relief and obstacle detection system also comprises means for textual display of the new or temporary information relating to an airport zone concerning particular obstacles.

4. The device for assisting in the navigation of an aircraft in an airport zone as claimed in claim 1, wherein the new or temporary information relating to an airport zone comprises NOTAMs.

* * * * *